US012579409B2

(12) United States Patent
Bandyopadhyay et al.

(10) Patent No.: US 12,579,409 B2
(45) Date of Patent: Mar. 17, 2026

(54) IDENTIFYING SENSOR DRIFTS AND DIVERSE VARYING OPERATIONAL CONDITIONS USING VARIATIONAL AUTOENCODERS FOR CONTINUAL TRAINING

(71) Applicant: Tata Consultancy Services Limited, Mumbai (IN)

(72) Inventors: Soma Bandyopadhyay, Kolkata (IN); Sridhar Balakrishnan, Hyderabad (IN); Shruti Sachan, Bangalore (IN); Yasasvy Tadepalli, Hyderabad (IN); Arpan Pal, Kolkata (IN); Anish Datta, Kolkata (IN); Karthik Leburi, Hyderabad (IN); Srinivas Raghu Raman Gadepally, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 644 days.

(21) Appl. No.: 18/093,594

(22) Filed: Jan. 5, 2023

(65) Prior Publication Data

US 2023/0281429 A1     Sep. 7, 2023

(30) Foreign Application Priority Data

Mar. 3, 2022    (IN)  ............................ 202221011569

(51) Int. Cl.
    *G06N 3/0455*       (2023.01)
    *G06F 18/21*        (2023.01)
(52) U.S. Cl.
    CPC ......... *G06N 3/0455* (2023.01); *G06F 18/217* (2023.01)
(58) Field of Classification Search
    CPC .... G06N 3/0455; G06N 3/047; G06N 3/0475; G06N 3/088; G06N 3/096; G06F 18/217
    See application file for complete search history.

(56) References Cited

U.S. PATENT DOCUMENTS

| | | | |
|---|---|---|---|
| 2016/0174902 A1* | 6/2016 | Georgescu | ............... G06T 7/73 |
| | | | 600/408 |
| 2022/0383038 A1* | 12/2022 | Hines | ....................... G06N 3/08 |
| 2024/0160939 A1* | 5/2024 | Mopur | ................... G06N 3/045 |

FOREIGN PATENT DOCUMENTS

CN       112328703 A     2/2021

OTHER PUBLICATIONS

Hajihassani O, Ardakanian O, Khazaei H. Anonymizing sensor data on the edge: A representation learning and transformation approach. ACM Transactions on Internet of Things. Oct. 27, 2021;3(1):1-26. (Year: 2021).*

(Continued)

*Primary Examiner* — Oluwatosin Alabi
(74) *Attorney, Agent, or Firm* — Finnegan, Henderson, Farabow, Garrett & Dunner, LLP

(57) ABSTRACT

Existing machine learning systems require historical data to perform analytics to detect faults in a machine and are unable to detect new types of faults/changes occurring in real time. These systems further fail to identify operation changes due to sensor drift and forget past events that have occurred. Present application provides systems and methods for identifying and classifying sensor drifts and diverse varying operational conditions from continually received sensor data using continual training of variational autoencoders (VAE) following drift specific characteristics, wherein sensor drift is compensated based on identified changes in sensors and degradation in machine(s). Rehearsal technique is performed by either VAE based generative models trained in previous iterations that are configured to generate a dataset corresponding to a current iteration, or discriminative instances of original dataset in previous iterations that are configured to generate a dataset corresponding (Continued)

to a current iteration, thus preventing from catastrophic forgetting.

17 Claims, 6 Drawing Sheets

(56)                    References Cited

OTHER PUBLICATIONS

Corrales, "Fault detection and identification methodology under an incremental learning framework applied to industrial electrome-chanical systems," (2017).

* cited by examiner

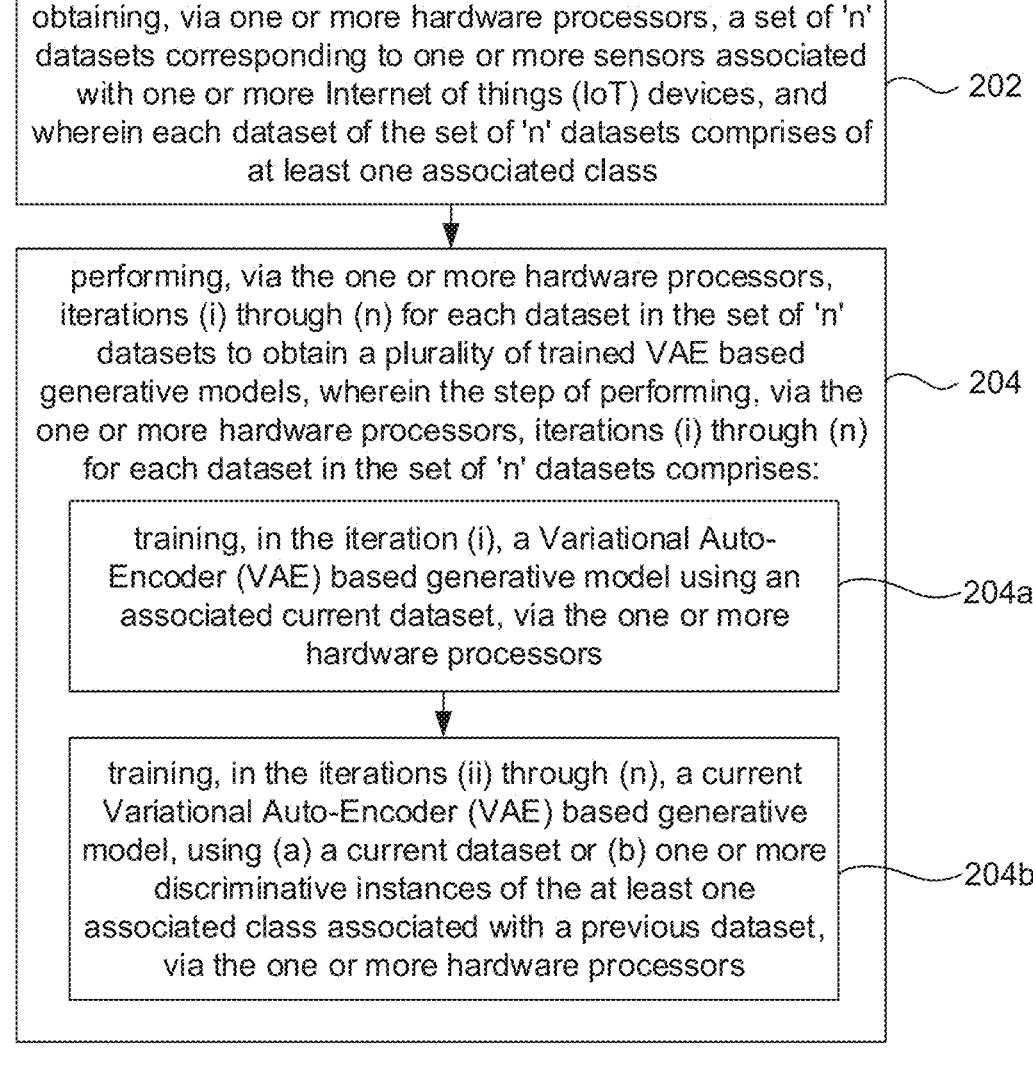

obtaining, via one or more hardware processors, a set of 'n' datasets corresponding to one or more sensors associated with one or more Internet of things (IoT) devices, and wherein each dataset of the set of 'n' datasets comprises of at least one associated class —— 202 performing, via the one or more hardware processors, iterations (i) through (n) for each dataset in the set of 'n' datasets to obtain a plurality of trained VAE based generative models, wherein the step of performing, via the one or more hardware processors, iterations (i) through (n) for each dataset in the set of 'n' datasets comprises: —— 204 training, in the iteration (i), a Variational Auto-Encoder (VAE) based generative model using an associated current dataset, via the one or more hardware processors —— 204a training, in the iterations (ii) through (n), a current Variational Auto-Encoder (VAE) based generative model, using (a) a current dataset or (b) one or more discriminative instances of the at least one associated class associated with a previous dataset, via the one or more hardware processors —— 204b

IDENTIFYING SENSOR DRIFTS AND DIVERSE VARYING OPERATIONAL CONDITIONS USING VARIATIONAL AUTOENCODERS FOR CONTINUAL TRAINING

PRIORITY CLAIM

This U.S. patent application claims priority under 35 U.S.C. § 119 to: Indian Patent Application No. 202221011569, filed on Mar. 3, 2022. The entire contents of the aforementioned application are incorporated herein by reference.

TECHNICAL FIELD

The disclosure herein generally relates to identifying sensor drifts and diverse varying operational conditions, more particularly using continual training with variational autoencoders.

BACKGROUND

Most current learning systems require years of historical machinery data to perform machine analytics to detect faults in a machine. Further, these types of system are unable to detect any new types of faults/changes occurring in real time. Availability of annotated data for diverse faults, sensor drifts, operational changes, etc. for industrial domain is a practical challenge. Moreover, identification of changes in operational condition both in normal state and faulty state is hard to achieve. Existing methods and system fail to distinguish further the operational changes caused by faulty conditions, degradation or due to load changes etc. and drift in sensing system.

SUMMARY

Embodiments of the present disclosure present technological improvements as solutions to one or more of the above-mentioned technical problems recognized by the inventors in conventional systems. For example, in one aspect, there is provided a processor implemented method for identifying sensor drifts and diverse varying operational conditions using continual training with variational autoencoders (VAE). The method comprises obtaining, via one or more hardware processors, a set of 'n' datasets corresponding to one or more sensors associated with one or more Internet of things (IoT) devices, and wherein each dataset of the set of 'n' datasets comprises of at least one associated class; performing, via the one or more hardware processors, iterations (i) through (n) for each dataset in the set of 'n' datasets to obtain a plurality of trained VAE based generative models, wherein the step of performing, via the one or more hardware processors, iterations (i) through (n) for each dataset in the set of 'n' datasets comprises: training, in the iteration (i), a Variational Auto-Encoder based generative model using an associated current dataset, via the one or more hardware processors; and training, in the iterations (ii) through (n), a current Variational Auto-Encoder (VAE) based generative model, using (a) a current dataset or (b) one or more discriminative instances of the at least one associated class associated with a previous dataset, via the one or more hardware processors, wherein each trained VAE based generative model corresponds to a dataset of the set of 'n' datasets.

In an embodiment, the set of 'n' dataset comprises at least one of healthy data and one or more varying operating conditions associated with the one or more Internet of things (IoT) devices.

In an embodiment, the plurality of trained VAE based generative models are used for rehearsal technique.

In an embodiment, the plurality of trained VAE based generative models are conditioned with one or more prior knowledge or without prior knowledge.

In an embodiment, the method further comprises identifying, by using the at least one trained VAE based generative model via the one or more hardware processors, one or more sensor drifts and one or more varying operating conditions corresponding to one or more datasets from the set of 'n' datasets; and segregating, by using the at least one trained VAE based generative model via the one or more hardware processors, the identified one or more sensor drifts from the set of 'n' datasets.

In an embodiment, the at least one trained VAE based generative model is constrained to learn one or more specific characteristics of at least one of the one or more identified sensor drifts and the one or more identified varying operating conditions.

In an embodiment, the one or more discriminative instances are identified based on a plurality of clusters generated from the previous dataset using one or more latent sequences comprised in the plurality of trained VAE based generative models.

In another aspect, there is provided a processor implemented system for identifying sensor drifts and diverse varying operational conditions using continual training of variational autoencoders. The system comprises: a memory storing instructions; one or more communication interfaces; and one or more hardware processors coupled to the memory via the one or more communication interfaces, wherein the one or more hardware processors are configured by the instructions to: obtain a set of 'n' datasets corresponding to one or more sensors associated with one or more Internet of things (IoT) devices, and wherein each dataset of the set of 'n' datasets comprises of at least one associated class; perform iterations (i) through (n) for each dataset in the set of 'n' datasets to obtain a plurality of trained VAE based generative models, wherein the step of performing iterations (i) through (n) for each dataset in the set of 'n' datasets comprises: training, in the iteration (i), a Variational Auto-Encoder (VAE) based generative model using an associated current dataset, via the one or more hardware processors; and training, in the iterations (ii) through (n), a current Variational Auto-Encoder (VAE) based generative model, using at least one of (a) a current dataset or (b) one or more discriminative instances of the at least one associated class associated with a previous dataset, via the one or more hardware processors, wherein each trained VAE based generative model corresponds to a dataset of the set of 'n' datasets.

In an embodiment, the set of 'n' dataset comprises at least one of healthy data and one or more varying operating conditions associated with the one or more Internet of things (IoT) devices.

In an embodiment, the plurality of trained VAE based generative models are used for rehearsal technique.

In an embodiment, the one or more hardware processors are further configured by the instructions to identify, by using the at least one trained VAE based generative model, one or more sensor drifts and one or more varying operating conditions corresponding to one or more datasets from the set of 'n' datasets; and segregate, by using the at least one trained VAE based generative model, the identified one or more sensor drifts from the set of 'n' datasets.

In an embodiment, the at least one trained VAE based generative model is constrained to learn one or more specific characteristics of at least one of the one or more identified sensor drifts and the one or more identified varying operating conditions.

In an embodiment, the one or more discriminative instances are identified based on a plurality of clusters generated from the previous dataset using one or more latent sequences comprised in the plurality of trained VAE based generative models.

In yet another aspect, there are provided one or more non-transitory machine-readable information storage mediums comprising one or more instructions which when executed by one or more hardware processors cause a method for identifying sensor drifts and diverse varying operational conditions using continual training of variational autoencoders by: obtaining, via the one or more hardware processors, a set of 'n' datasets corresponding to one or more sensors associated with one or more Internet of things (IoT) devices, and wherein each dataset of the set of 'n' datasets comprises of at least one associated class; performing, via the one or more hardware processors, iterations (i) through (n) for each dataset in the set of 'n' datasets to obtain a plurality of trained VAE based generative models, wherein the step of performing, via the one or more hardware processors, iterations (i) through (n) for each dataset in the set of 'n' datasets comprises: training, in the iteration (i), a Variational Auto-Encoder (VAE) based generative model using an associated current dataset, via the one or more hardware processors; and training, in the iterations (ii) through (n), a current Variational Auto-Encoder (VAE) based generative model, using (a) a current dataset or (b) one or more discriminative instances of the at least one associated class associated with a previous dataset, via the one or more hardware processors, wherein each trained VAE based generative model corresponds to a dataset of the set of 'n' datasets.

In an embodiment, the set of 'n' dataset comprises at least one of healthy data and one or more varying operating conditions associated with the one or more Internet of things (IoT) devices.

In an embodiment, the plurality of trained VAE based generative models are used for rehearsal technique.

In an embodiment, the one or more discriminative instances of a dataset obtained in a current iteration are used for rehearsal technique in a subsequent iteration (i+1) as an option.

In an embodiment, the instructions which when executed by the one or more hardware processors further cause identifying, by using the at least one trained VAE based generative model, one or more sensor drifts and one or more varying operating conditions corresponding to one or more datasets from the set of 'n' datasets; and segregating, by using the at least one trained VAE based generative model, the identified one or more sensor drifts from the set of 'n' datasets.

In an embodiment, the at least one trained VAE based generative model is constrained to learn one or more specific characteristics of at least one of the one or more identified sensor drifts and the one or more identified varying operating conditions.

In an embodiment, the one or more discriminative instances are identified based on a plurality of clusters generated from the previous dataset using one or more latent sequences comprised in the plurality of trained VAE based generative models.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 depicts an exemplary flow chart illustrating a method for identifying sensor drifts and diverse varying operational conditions using continual training of the variational autoencoders (VAE) based generative models, using the systems of FIG. 1-2, in accordance with an embodiment of the present disclosure.

DETAILED DESCRIPTION

Figure 1:
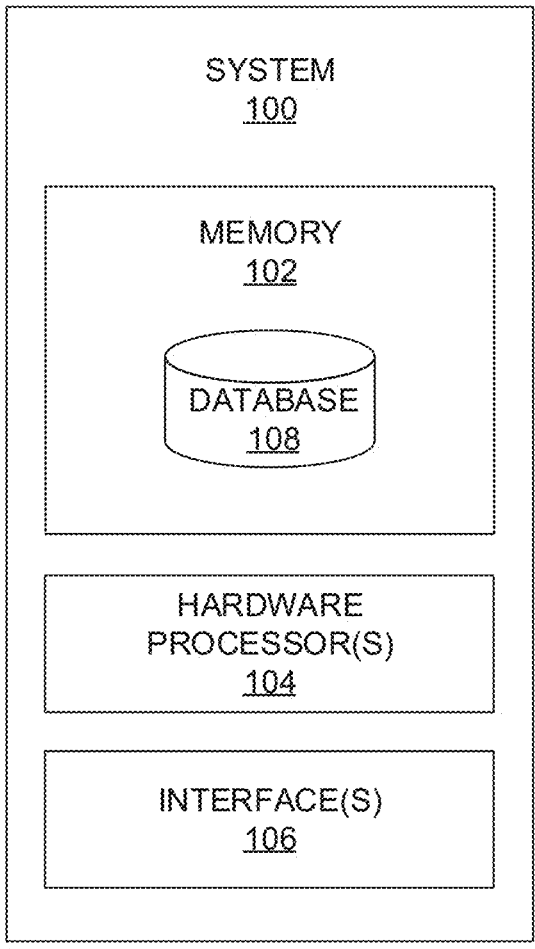
FIG. 1 depicts an exemplary system for identifying sensor drifts and diverse varying operational conditions using continual training of variational autoencoders (VAE) based generative models, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned above, existing machine learning systems require lot of historical machinery data to perform machine analytics to detect faults in a machine. Further, these types of system are unable to detect any new types of faults/ changes occurring in real time. Availability of annotated data for diverse faults, sensor drifts, operational changes, etc. for industrial domain is a practical challenge. Existing methods and system fail to identify operation changes due to sensor drift, and do not learn the events and tend to forget the past events that have occurred.

Embodiments of the present disclosure provide systems and methods for identifying sensor drifts and diverse varying operational conditions using continual training of variational autoencoders (VAE). The embodiments enable the system and method to reduce latency in the process of analytics and continual training with limited annotation further reduce involvement of subject matter experts. For instance, learning of VAE at an edge when implemented reduces latency due to minimal data transfer from edge to cloud. As a type of self-training approach is employed by the system of the present disclosure, data need not be annotated manually (which can only occur in cloud) every time. Only when a new machine signature is observed, the data is transferred to cloud for expert annotation. Also, incremental/continual learning is suitable at edge as it does not require large amounts of stored data (edge systems generally have less storage). The system and method further enable faster decision making. This is achieved as learning at edge occurs in real time, thus on-premises decision making for time critical high value industrial assets improves.

By implementing the VAEs, the system and method are capable of adapting to changing environments. For instance, system can adapt to changing systems as it learns in near-real time and does not require a new model to be trained from scratch/beginning if one or more operational conditions/other factors are varied.

More specifically, the present disclosure provides a system that implements an end-to-end learning methodology (or also referred as a framework and interchangeably used herein) (e.g., when implemented at edge devices) where variations in operational conditions of machine/Internet of Things (IoT) devices in both normal and abnormal states (due to faults) which includes various sensing drifts are to be classified using minimal annotated data and expert involvement. This learning framework (e.g., say at edge devices) compensates the sensor drift by identifying the changes in the sensors due to various conditions and learns to identify the degradation in the machinery. Such incremental/continual (wherein incremental and continual may be interchangeably used herein) learning does not require large amounts of data for training the model. When a new machine signature is captured, the model is retrained to predict the class of the new signature. Moreover, with the help of incremental learning, the system adapts to the new data without forgetting its existing knowledge.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 depicts an exemplary system 100 for identifying sensor drifts and diverse varying operational conditions using continual training of variational autoencoders, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information a plurality of datasets, wherein each dataset comprises time-series data corresponding to (or specific to) one or more sensor devices (or IoT devices/machines/machine parts, and the like) deployed in an IoT environment (e.g., say a manufacturing industry). The database 108 further comprises one or more associated classes specific to each dataset stored in the database 108, and the like. Further, the memory 102 stores various technique(s), models, such as, but are not limited to, Variational Auto-Encoder (VAE) based generative model(s), rehearsal technique(s), and the like. Furthermore, the memory 102 stores information on the training of the VAE based generative models, and the like.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
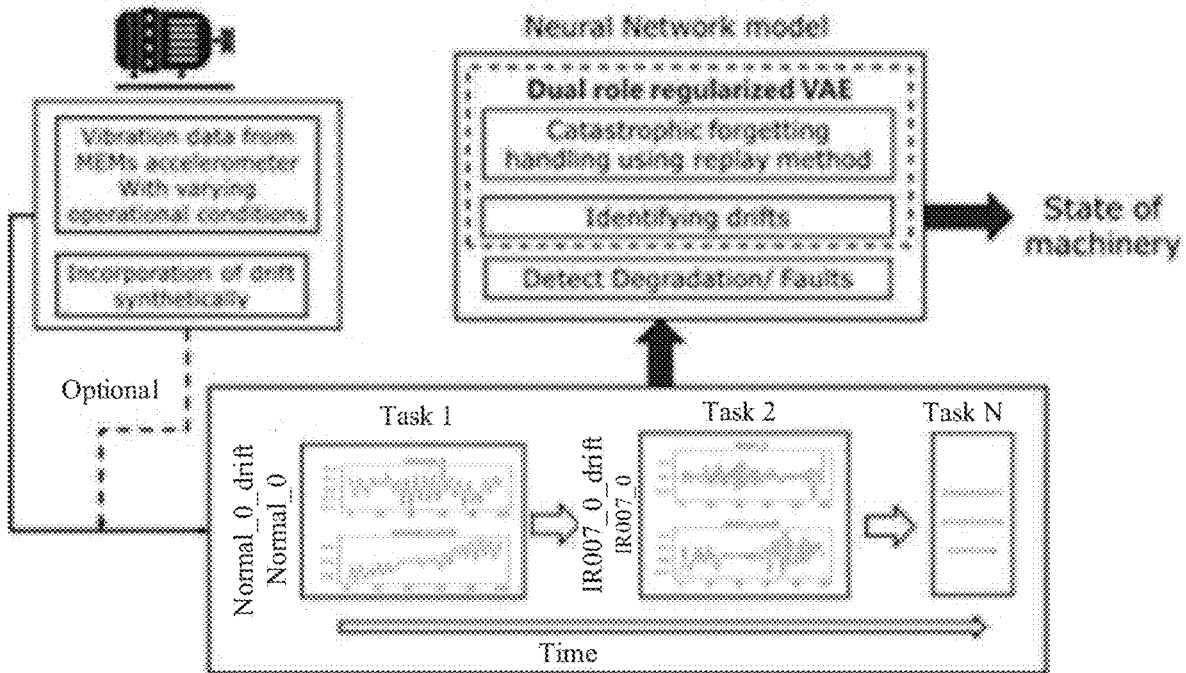
FIG. 2 depict an exemplary high level block diagram of the system for identifying sensor drifts and diverse varying operational conditions using continual training of the variational autoencoders (VAE) based generative models, in accordance with an embodiment of the present disclosure, in accordance with an embodiment of the present disclosures.

FIG. 2 depicts an exemplary high level block diagram of the system 100 for identifying sensor drifts and diverse varying operational conditions using continual training of variational autoencoders, in accordance with an embodiment of the present disclosure, in accordance with an embodiment of the present disclosure.

FIG. 3 depicts an exemplary flow chart illustrating a method 200 for identifying sensor drifts and diverse varying operational conditions using continual training of variational autoencoders, using the systems of FIG. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

In an embodiment of the present disclosure, at step 202, the one or more hardware processors 104 obtain a set of 'n' datasets corresponding to one or more sensors associated with one or more Internet of things (IoT) devices. In an embodiment, each dataset of the set of 'n' datasets comprises of at least one associated class. For instance, each dataset of the 'n' datasets comprises a time-series data obtained specific to various parts/machine components of a device/ machine (e.g., say a motor). For instance, time-series data may include, but not limited to, vibration data from MEMs (micro electro-mechanical systems), accelerometer data with varying operating conditions, and the like. Such dataset or time-series data is continually obtained/received by the system 100 at various time instances. Say at time 't' instance, a first dataset (say d1) comprising time-series data as mentioned may be received. At time 't+1' instance a second dataset (d2) comprising time-series data as mentioned may be received. Similarly, various time-series data (e.g., say d3 to dn dataset) may be received until 't+n' time instance. Each dataset from the set of 'n' dataset comprises at least one of healthy data and one or more varying operating conditions associated with the one or more Internet of things (IoT) devices.

In an embodiment of the present disclosure, at step 204, the one or more hardware processors 104 perform iterations (i) through (n) for each dataset in the set of 'n' datasets to obtain a plurality of trained VAE based generative models. The step of performing, iterations (i) through (n) for each dataset in the set of 'n' datasets comprises may be realized via steps 204*a* through 204*b* as described herein. For instance, at step 204*a* of the present disclosure, the one or more hardware processors 104 train, in the iteration (i), a Variational Auto-Encoder (VAE) based generative model using an associated current dataset (d1). Iteration (i) may be referred as task t1 and may be interchangeably used herein. For instance, task t1 refers to training of the VAE using the current dataset say d1. Each dataset may have one or more associated class (e.g., either say normal data class, varying operating conditions class, and the like). In an embodiment, the normal data class may be referred as a class c1. Similarly, other operating conditions may include faulty data that may be categorized as c2, c3, c4 and so on. At step 204*b* of the present disclosure, the one or more hardware processors 104 train, in the iterations (ii) through (n), a current Variational Auto-Encoder (VAE) based generative model, using (a) a current dataset (d2) or (b) one or more discriminative instances (e.g., denoted by ds1 obtained from the dataset d1) of the at least one associated class associated with a previous dataset. Each trained VAE based generative model corresponds to a dataset of the set of 'n' datasets.

The steps 204*a* till 204*b* are continually performed until the last dataset is processed to obtain one or more trained VAE based generative models. The one or more discriminative instances are identified based on a plurality of clusters generated from the previous dataset using one or more latent sequences comprised in the plurality of trained VAE based generative models (e.g., for cluster formation—refer METHOD AND SYSTEM FOR HIERARCHICAL TIME-SERIES CLUSTERING WITH AUTO ENCODED COMPACT SEQUENCE (AECS) application number Application Number: 202021015292). The steps 204*a* through 204*b* may be better understood by way of following description. Assuming the dataset d1 is fed as an input to the current Variational Auto-Encoder (VAE) based generative model to perform a task t1 (e.g., training of the current VAE based generative model—say VAE1). It is further assumed that the dataset d1 has normal data and is classified as of class c1. The VAE1 is trained using d1 and c1 are used for a rehearsal technique. This training of VAE1 is used for the rehearsal technique that enables the system 100 to remember the process involved in current iteration (e.g., say (i)). During the training of VAE2 or while performing iterations (ii) till (n), the system 100 ensures that discriminative samples (ds1) are obtained/data generated using the d1 and c1 by VAE. This ds1 with current dataset say d2 along with one or more associated classes (e.g., for dataset d2 there could time-series data which include both normal and faulty data, say c2 and/or c3) are used to train a current VAE (e.g., say VAE2). Training of current VAE2 is referred as say task t2. The plurality of trained VAE based generative models are conditioned with one or more prior knowledge of class labels or without prior knowledge, in an embodiment of the present disclosure. In an embodiment, the rehearsal technique is performed by the plurality of VAE based generative models trained in one or more previous iterations that are configured to generate a dataset corresponding to a current iteration. In another embodiment, the rehearsal technique is performed by the one or more discriminative instances of original dataset in one or more previous iterations that are configured to generate a dataset corresponding to a current iteration.

Similarly, during the training of VAEn (or nth VAE training) or while performing iteration say (n), the system 100 ensures that discriminative samples (dsn−1) are obtained/generated using the dn−1 and associated class. For instance, say iteration (3) is the last iteration and referred as iteration (n). Therefore, while performing the task say t3 (or tn), VAE3/VAEn is trained using (i) discriminative samples (dsn−1) (or in this case ds2) generated from previous dataset (say d2) and (ii) d2 and its associated class. It is to be understood by a person having an ordinary skill in the art or person skilled in the art that at a given instance, while training of a current VAE is performed, the current dataset used for training the current VAE, may include time-series data that has either normal data classified as cx or faulty data classified cy, or combinations thereof. This data along with discriminative samples generated using previous dataset and associated class are used for training a current VAE as mentioned above. The ability to generated and use discriminative samples generated using previous dataset enables the system to remember old/previous tasks and prevent any catastrophic forgetting. In an embodiment, the one or more discriminative instances are identified based on a plurality of clusters generated from the previous dataset using one or more latent sequences comprised in the plurality of trained VAE based generative models.

Figure 4:
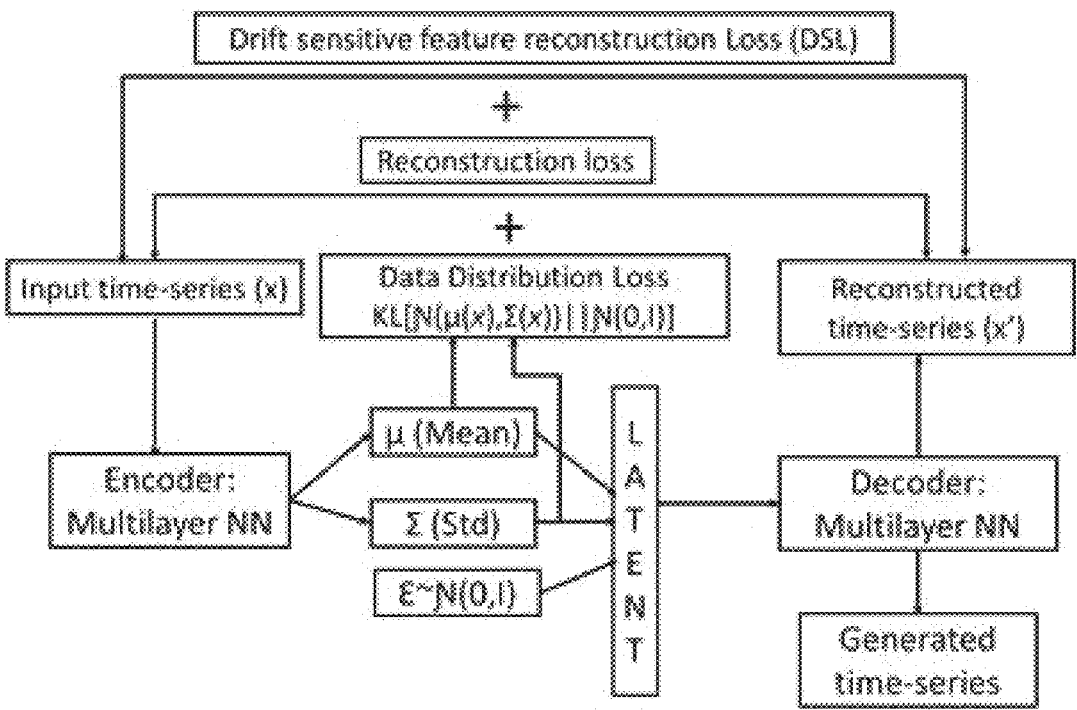
FIG. 4 depicts a block diagram of a VAE based generative model illustrating neighborhood mapping exploiting a choice of best distance measure for handling limited dataset scenarios, in accordance with an embodiment of the present disclosure.

During the training of the VAE based generative models, at each iteration of task being performed, one or more sensor drifts and one or more varying operating conditions corresponding to one or more datasets from the set of 'n' datasets are identified, by using the at least one trained VAE based generative model via the one or more hardware processors. The identified one or more sensor drifts are segregated from the set of 'n' datasets. In an embodiment, the at least one trained VAE based generative model is constrained to learn one or more specific characteristics of at least one of the one or more identified sensor drifts and the one or more identified varying operating conditions. Such iterative or continual training of VAE based generative models can be realized as depicted in FIG. 3 of the present disclosure. The architecture as depicted in FIG. 3 illustrates an enhanced neural network model based on generative learning in dual role, wherein system 100 employs objective function to deploy following dual role: (i) identifying drifts (from sensors and/or from operational condition variations), wherein encoder-decoder part (shown in FIG. 4) along with modified drift sensitive objective function is used for degradation/drift identification along with quantifying similarity/dissimilarity, (ii) addressing catastrophic forgetting—wherein the latent distribution learnt from the VAE based generative model is used for generating new samples for handling catastrophic forgetting. Latent distribution uses the mean and standard deviation which are obtained by a neural network and representation learned from input data with a prior knowledge, in one example embodiment of the present disclosure. FIG. 4, with reference to FIGS. 1 through 3, depicts a block diagram of the VAE based generative model illustrating neighborhood mapping exploiting a choice of best distance measure for handling limited dataset scenarios, in accordance with an embodiment of the present disclosure. More specifically, FIG. 4 depicts VAE based generative model for generating discriminate samples/instances. Discriminative samples comprising important representations are identified based on (consistent) clusters being formed/generated using choice of best distance measure and clustering by applying a hierarchical clustering technique, followed by most distant instance member using the selected best distance measure. In other words, discriminative samples comprise of members of each group/cluster formed which are furthest from each other based on distance measure used. This is applied for both, inter and intra cluster scenarios.

A threshold is defined i.e., percentage of complete data to be considered as total number of discriminative instances to be selected as number of important/distant samples to be chosen. The threshold may vary from 40-70% of the entire dataset. These discriminative samples are used for training the VAE-based generative model when a new task arrives. Total loss of the VAE based generative model (or models) is computed and expressed as follows:

$$\text{Total Loss}=R+\beta*KL+DSL \ (R=\text{Reconstruction Loss},$$
$$KL=\text{Data Distribution Loss}); DSL-\text{Sensor drift sensitive feature loss}).$$

As mentioned above, the VAE based generative model plays a dual role: (i) identifying drifts (from sensors and/or from operational condition variations), wherein encoder-decoder part depicted in FIG. 4 is used for degradation/drift identification along with quantifying similarity/dissimilarity, and (ii) reconstruction loss is computed wherein neighborhood mapping are to be exploited for sensor drift identification; along with inheriting (drift sensitive features) specific features by constraining the VAE based generative model while learning and constructing its loss function accordingly. Further, the present disclosure also addresses the catastrophic forgetting by learning latent distribution from the VAE generative model for generating new samples from old tasks (or previous iteration) and use it for current iteration training of current VAE. The latent distribution of the entire dataset (e.g., set of 'n' datasets) can be realized through mean, standard deviation and the like in the latent space using the latent sequence of the VAE based generative model for generating new samples (e.g., discriminative samples/instances).

Each VAE based generative model is trained task wise instead of individual classes. A new LSTM layer is introduced in encoder and decoder of hidden units—48. The second layer has 32 hidden units. The latent space dimension is of length 32. Hierarchical clustering (e.g., clustering technique) is performed on the latent representation learnt by the dual role generative model. Neighborhood mapping is performed using minimal labelled data to label the discriminative instances using the best distance measure in the latent space. Further, for generating discriminative instances for a particular class, conditional VAE based generative model is used. In the present disclosure, the system 100 implemented a neural network model (e.g., VAE based generative model wherein a first layer is greater than the second layer comprised in the encoder and decoder. It is to be understood by a person having ordinary skill in the art or person skilled in the art that the architecture depicted in FIG. 2 is one such variant of implementing for executing the steps of the method described herein and such architecture depicted in FIG. 2 shall not be construed as limiting the scope of the present disclosure.

Figure 5:
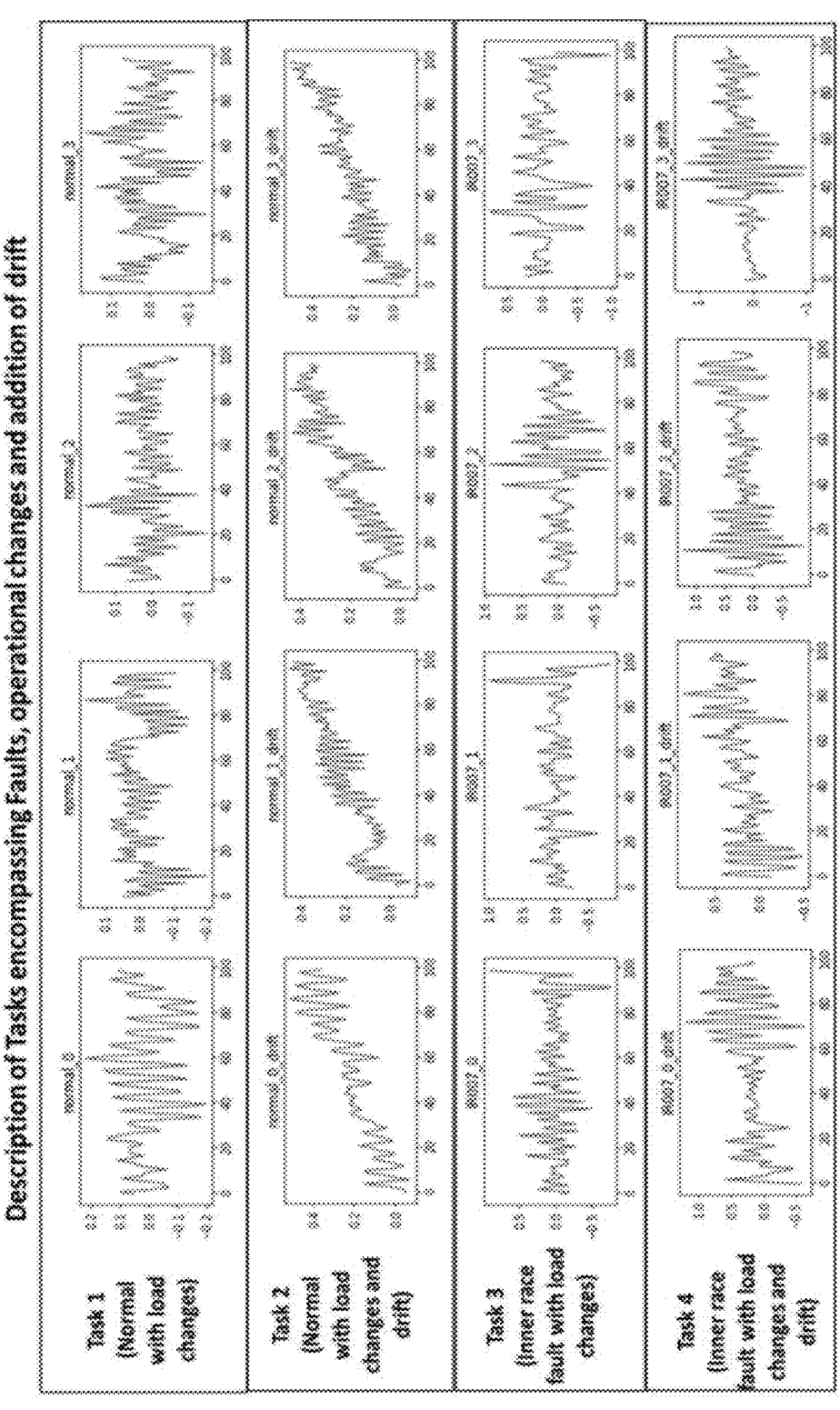
FIG. 5 depicts graphical representations of dataset comprise various tasks, operating/operational changes, and addition of drifts, in accordance with an embodiment of the present disclosure.

Experimental Analysis:

Experimental analysis has been performed with public real-world bearing dataset of rotating machinery, in an example embodiment of the present disclosure. Sensor drift signatures (e.g., also referred as sensor drift or sensor drift data) were into this dataset. This dataset consisted of operational changes as load variations and fault signatures. It is to be understood by a person having ordinary skill in the art or person skilled in the art that the following data were available (i) limited annotations, (ii) variety of operational conditions, (iii) differentiating drifts from degradation/faults signatures, and (iv) response in near real time (learn at edge environment). More specifically, experimentation was conducted on a publicly available bearing dataset by incorporating drift on various types of signatures (Normal/Inner Race Fault) with operational condition changes (load variations). The description of the signatures and an exemplary sequence in which they occur is shown in FIG. 5. More specifically, FIG. 5, with reference to FIGS. 1 through 4, depicts graphical representations of dataset comprise various tasks, operating/operational changes, and addition of drifts, in accordance with an embodiment of the present disclosure. For instance, task t1 included dataset d1 with normal dataset with load changes) for training VAE1, task t2 included dataset d2 with normal dataset with load changes and drift) for training VAE2, etc. Task 3 further included dataset d3 comprising inner race fault with load changes for training VAE3. Task 4 included dataset d4 comprising inner race fault with load changes and drift for training VAE/VAEn.

More specifically, the following were considered during the experimentation conducted by the system and method of the present disclosure:

1. Faults generated under varying operational conditions (motor load here) was considered.
2. Machine was operated under four motor loads: 0, 1, 2, and 3 horse power (HP) respectively.
3. Each class is defined as the combination of the type of normal/fault signature with the motor load condition (0/1/2/3 HP).
4. Classes were denoted as "Fault_load" where "Fault" is fault type (or normal) and "load" is the motor load. For example, say IR007_0 indicates Inner Race Fault with 0.007 inches diameter with motor load of 0 HP
5. Classes where drifts are introduced have been labelled with "drift" added.
6. After each machine condition (Normal or Inner Race Fault (IR)), signals with drifts incorporated on the machine condition are added.

Results:

The method of the present disclosure outperforms existing benchmark continual learning techniques such as Learning without Forgetting (LwF), Elastic Weight Consolidation (EWC), MP-GAN significantly. Below are few outputs of the method of the present disclosure in comparison to existing benchmark approaches based on the experiment conducted.

1. Average task-wise accuracy by the method of the present disclosure: 0.821
2. Average task-wise accuracy (No catastrophic forgetting handling): 0.755
3. Average task-wise accuracy (LwF—conventional approach): 0.783
4. Average task-wise accuracy (EWC—conventional approach): 0.777
5. Average task-wise accuracy (MP-GAN—conventional approach): 0.786

Figure 6:
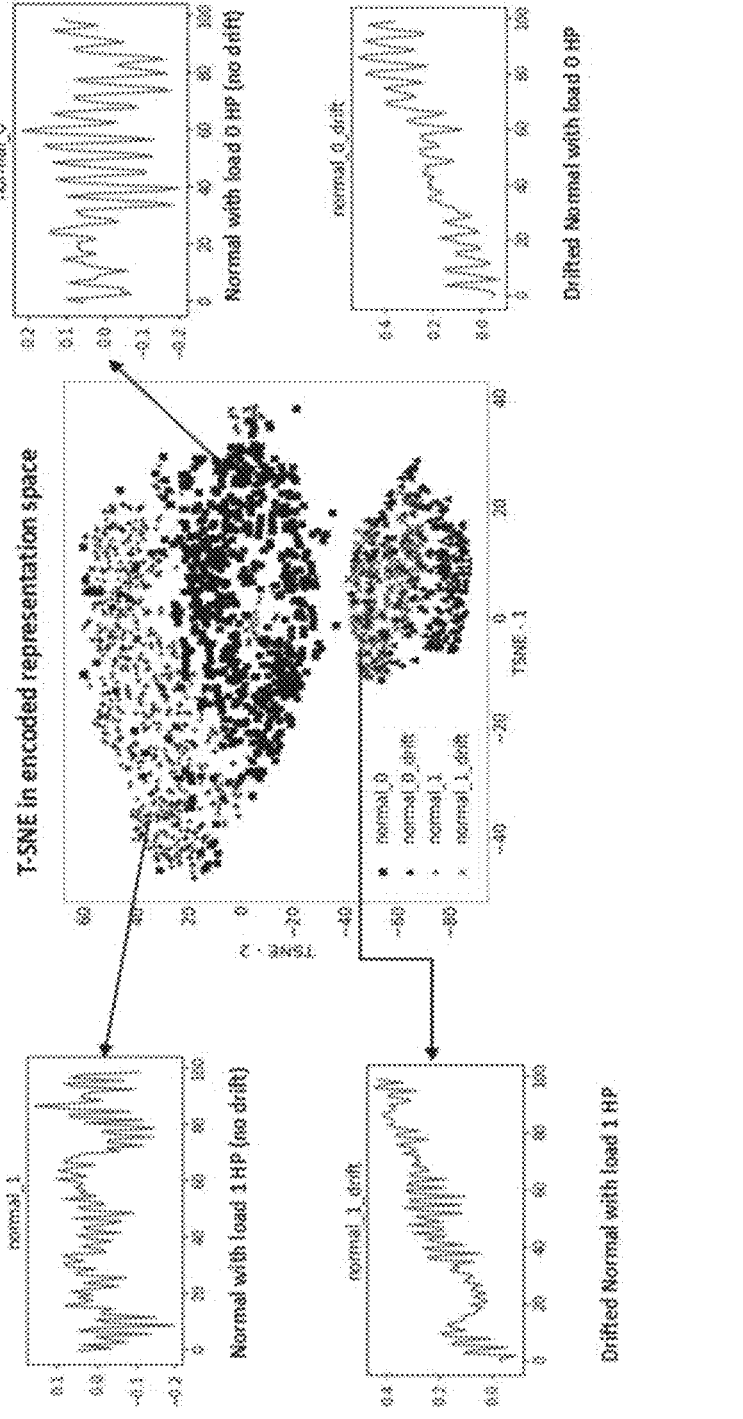
FIG. 6 depicts a graphical representation of a plurality of clusters being generated from a previous dataset using one or more latent sequences comprised in the trained VAE based generative models, in accordance with an embodiment of the present disclosure.

FIG. 6, with reference to FIGS. 1 through 5, depicts a graphical representation of a plurality of clusters being generated from a previous dataset using one or more latent sequences comprised in the plurality of trained VAE based generative models, in accordance with an embodiment of the present disclosure. More specifically, it can be observed from FIG. 6 that two clusters are formed among which one comprises of all normal non-drifted instances and another all-drifted windows. As mentioned above, during the training, the VAE based generative models are constrained to learn one or more specific characteristics (e.g., also referred as sensitive parameters) of at least one of the one or more identified sensor drifts and the one or more identified varying operating conditions. Below are illustrated such sensitive parameters, by way of examples:

Drift Sensitive Parameters:

Kurtosis can be an important drift sensitive parameter. Variations of kurtosis for classes in different tasks are noted below:

1. Task 1: (Normal)
   a) Kurtosis of encoded space for class normal_0=1.2446
   b) Kurtosis of encoded space for class normal_0_drift=0.0395
   c) Kurtosis of encoded space for class normal_1=1.2820
   d) Kurtosis of encoded space for class normal_1_drift=0.2189
2. Task 3: (Inner Race Fault)
   a) Kurtosis of encoded space for class IR007_0=2.651068692353949
   b) Kurtosis of encoded space for class IR007_0_drift=1.6766420714216286
   c) Kurtosis of encoded space for class IR007_1=2.6216747250050885
   d) Kurtosis of encoded space for class IR007_1_drift=1.7318113530775063

It can be observed from the above sensitive parameters that the kurtosis of the latent representation is higher for non-drifted instances than drifted instances for normal as well as fault data. There is clear separation between drift and non-drift instances in the clustering but the operational conditions (load changes) in the drifted data is not separated. In other words, the sensor drifts are identified and segregated from the entire dataset that are continually received by the system 100.

Few other sensitive parameters include, but are not limited to:

1. Baseline drifting ratio (DR):

$$DR = \left| \frac{mean[d(t)]}{rms[d_{real}(t)]} \right|,$$

where d(t) stands for the displacement gained based on assumed initial integral conditions and $d_{real}(t)$ is the "real" displacement.

$$\begin{cases} DR = 0 \ ... \ \text{No drifting} \\ 0 < DR \leq 0.1 \ ... \ \text{Approximately No Drifting} \\ 0.1 < DR \leq 1 \ ... \ \text{Slightly Drifting} \\ 1 < DR \leq 3 \ ... \ \text{Moderate Drifting} \\ DR > 3 \ ... \ \text{Severe Drifting} \end{cases}$$

2. Amplitude Ratio (AR):

$$AR = \left| \frac{rms[d(t)]}{rms[d_{real}(t)]} \right|$$

where d(t) stands for the displacement gained based on assumed initial integral conditions and $d_{real}(t)$ is the "real" displacement. For further details on Amplitude Ratio, refer Pan, Chao, et al. "Baseline correction of vibration acceleration signals with inconsistent initial velocity and displacement." Advances in Mechanical Engineering 8.10 (2016): 1687814016675534.

The present disclosure enables the system and method described herein to perform robust monitoring of high value industrial assets to address the dynamic shifts—varying operational condition of machinery, sensor drifts. The above statement is better understood by way of following description illustrated below: Continuous monitoring of the state of a machinery/IoT device to identify various signatures of operational changes and degradation along with drift in sensing systems is a challenging problem. This also demands capability of continual learning with limited knowledge of task labels and boundaries with multiple interventions or shifts. Here, the knowledge learned in previous time-window is used to learn better in present time-window. However, forgetting the past learned knowledge known as catastrophic forgetting impacts significantly on the performance of continuous monitoring. Hence, the present disclosure provides systems and methods that implement VAE based generative model (e.g., also referred as a dual role neural network model) which handles catastrophic forgetting by capturing past data distribution knowledge even with the availability of very less annotation to adapt new data signatures without forgetting its existing knowledge and at the same time to identify drifts in sensors as well as signatures of degradations/faults.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

obtaining, via one or more hardware processors, a set of 'n' datasets corresponding to one or more sensors associated with one or more Internet of things (IoT) devices, and wherein each dataset of the set of 'n' datasets comprises of at least one associated class; and performing, via the one or more hardware processors, iterations (i) through (n) for each dataset in the set of 'n' datasets to obtain a plurality of trained Variational Auto-Encoder (VAE) based generative models, wherein the step of performing, iterations (i) through (n) for each dataset in the set of 'n' datasets comprises:

training, in the iteration (i), a VAE based generative model using an associated current dataset and at least one associated class of the associated current dataset, via the one or more hardware processors;

training, in the iterations (ii) through (n), a current VAE based generative model, using (a) a current dataset or (b) one or more discriminative instances of the at least one associated class associated with a previous dataset, via the one or more hardware processors, wherein 'n' is an integer greater than 1, wherein each trained VAE based generative model corresponds to a dataset of the set of 'n' datasets;

identifying, by using at least one trained VAE based generative model from the plurality of trained VAE based generative models via the one or more hardware processors, one or more sensor drifts and one or more varying operating conditions corresponding to one or more datasets from the set of 'n' datasets, wherein the one or more varying operating conditions relates to variations in operating conditions of the one or more IoT devices in a normal state and an abnormal state due to faults that includes various sensing drifts classified using annotated data; and segregating, by using the at least one trained VAE based generative model via the one or more hardware processors, the identified one or more sensor drifts from the set of 'n' datasets, wherein the at least one trained VAE based generative model is constrained to learn one or more specific characteristics of at least one of the one or more identified sensor drifts and the one or more identified varying operating conditions, wherein the specific characteristics correspond to drift sensitive parameters comprising a Kurtosis, a Baseline drifting (DR) ratio, and an Amplitude ratio (AR);

compensating with the learning of the specific characteristics, the one or more sensor drifts by identifying changes in the IoT sensors due to conditions and the degradation in machinery;

retraining the VAE based generative model, upon capturing a new machine signature, followed by predicting the associated class of the new machine signature, further with incremental learning, the VAE based generative model adapts to new data signatures without forgetting existing knowledge along with identifying the sensor drifts and corresponding signatures of the faults; and

implementing learning of the VAE based generative model at an edge reduces latency with reduced data transfer from the edge to a cloud.

2. The processor implemented method of claim 1, wherein the set of 'n' dataset comprises at least one of healthy data and one or more varying operating conditions associated with the one or more Internet of things (IoT) devices.

3. The processor implemented method of claim 1, wherein the plurality of trained VAE based generative models is used for a technique enabling remembrance of the training involved in the iteration (i).

4. The processor implemented method of claim 3, wherein the technique is performed by the plurality of VAE based generative models trained in one or more previous iterations that are configured to generate a dataset corresponding to a current iteration.

5. The processor implemented method of claim 3, wherein the technique is performed by the one or more discriminative instances of original dataset in one or more previous iterations that are configured to generate a dataset corresponding to a current iteration.

6. The processor implemented method of claim 1, wherein the one or more discriminative instances are identified based on a plurality of clusters generated from the previous dataset using one or more latent sequences comprised in the plurality of trained VAE based generative models.

7. A system, comprising:
a memory storing instructions;
one or more communication interfaces; and
one or more hardware processors coupled to the memory via the one or more communication interfaces, wherein the one or more hardware processors are configured by the instructions to:
obtain a set of 'n' datasets corresponding to one or more sensors associated with one or more Internet of things (IoT) devices, and wherein each dataset of the set of 'n' datasets comprises of at least one associated class; and
perform iterations (i) through (n) for each dataset in the set of 'n' datasets to obtain a plurality of trained Variational Auto-Encoder (VAE) based generative models, wherein the step of performing, via the one or more hardware processors, iterations (i) through (n) for each dataset in the set of 'n' datasets comprises:
training, in the iteration (i), a VAE based generative model using an associated current dataset and at least one associated class of the associated current dataset;
training, in the iterations (ii) through (n), a current VAE based generative model, using (a) a current dataset or (b) one or more discriminative instances of the at least one associated class associated with a previous dataset, via the one or more hardware processors, wherein 'n' is an integer greater than 1,
wherein each trained VAE based generative model corresponds to a dataset of the set of 'n' datasets;
identify, by using at least one trained VAE based generative model from the plurality of trained VAE based generative models via the one or more hardware processors, one or more sensor drifts and one or more varying operating conditions corresponding to one or more datasets from the set of 'n' datasets, wherein the one or more varying operating conditions relates to variations in operating conditions of the one or more IoT devices in a normal state and an abnormal state due to faults that includes various sensing drifts classified using annotated data; and
segregate, by using the at least one trained VAE based generative model via the one or more hardware processors, the identified one or more sensor drifts from the set of 'n' datasets, wherein the at least one trained VAE based generative model is constrained to learn one or more specific characteristics of at least one of the one or more identified sensor drifts and the one or more identified varying operating conditions, wherein the specific characteristics correspond to drift sensitive parameters comprising a Kurtosis, a Baseline drifting (DR) ratio, and an Amplitude ratio (AR);
compensate with the learning of the specific characteristics, the one or more sensor drifts by identifying changes in the IoT sensors due to conditions and the degradation in machinery;
retrain the VAE based generative model, upon capturing a new machine signature, followed by predicting the associated class of the new machine signature, further with incremental learning, the VAE based generative model adapts to new data signatures without forgetting existing knowledge along with identifying the sensor drifts and corresponding signatures of the faults; and
implement learning of the VAE based generative model at an edge reduces latency with reduced data transfer from the edge to a cloud.

8. The system of claim 7, wherein the set of 'n' dataset comprises at least one of healthy data and one or more varying operating conditions associated with the one or more Internet of things (IoT) devices.

9. The system of claim 7, wherein the plurality of trained VAE based generative models are used for a technique.

10. The system of claim 9, wherein the technique is performed by the plurality of VAE based generative models trained in one or more previous iterations that are configured to generate a dataset corresponding to a current iteration.

11. The system of claim 9, wherein the technique is performed by the one or more discriminative instances of original dataset in one or more previous iterations that are configured to generate a dataset corresponding to a current iteration.

12. The system of claim 7, wherein the one or more discriminative instances are identified based on a plurality of clusters generated from the previous dataset using one or more latent sequences comprised in the plurality of trained VAE based generative models.

13. One or more non-transitory machine-readable information storage mediums comprising one or more instructions which when executed by one or more hardware processors cause:
obtaining a set of 'n' datasets corresponding to one or more sensors associated with one or more Internet of things (IoT) devices, and wherein each dataset of the set of 'n' datasets comprises of at least one associated class; and
performing iterations (i) through (n) for each dataset in the set of 'n' datasets to obtain a plurality of trained Variational Auto-Encoder (VAE) based generative models, wherein the step of performing, iterations (i) through (n) for each dataset in the set of 'n' datasets comprises:
training, in the iteration (i), a VAE based generative model using an associated current dataset;
training, in the iterations (ii) through (n), a current VAE based generative model, using (a) a current dataset or (b) one or more discriminative instances of the at least one associated class associated with a previous dataset, wherein 'n' is an integer greater than 1,
wherein each trained VAE based generative model corresponds to a dataset of the set of 'n' datasets;

identifying, by using at least one trained VAE based generative model from the plurality of trained VAE based generative models via the one or more hardware processors, one or more sensor drifts and one or more varying operating conditions corresponding to one or more datasets from the set of 'n' datasets, wherein the one or more varying operating conditions relates to variations in operating conditions of the one or more IoT devices in a normal state and an abnormal state due to faults that includes various sensing drifts classified using annotated data; and segregating, by using the at least one trained VAE based generative model via the one or more hardware processors, the identified one or more sensor drifts from the set of 'n' datasets, wherein the at least one trained VAE based generative model is constrained to learn one or more specific characteristics of at least one of the one or more identified sensor drifts and the one or more identified varying operating conditions, wherein the specific characteristics correspond to drift sensitive parameters comprising a Kurtosis, a Baseline drifting (DR) ratio, and an Amplitude ratio (AR);

compensating with the learning of the specific characteristics, the one or more sensor drifts by identifying changes in the IoT sensors due to conditions and the degradation in machinery;

retraining the VAE based generative model, upon capturing a new machine signature, followed by predicting the associated class of the new machine signature, further with incremental learning, the VAE based generative model adapts to new data signatures without forgetting existing knowledge along with identifying the sensor drifts and corresponding signatures of the faults; and implementing learning of the VAE based generative model at an edge reduces latency with reduced data transfer from the edge to a cloud.

14. The one or more non-transitory machine-readable information storage mediums of claim 13, wherein the set of 'n' dataset comprises at least one of healthy data and one or more varying operating conditions associated with the one or more Internet of things (IoT) devices.

15. The one or more non-transitory machine-readable information storage mediums of claim 13, wherein the plurality of trained VAE based generative models is used for technique.

16. The one or more non-transitory machine-readable information storage mediums of claim 15, wherein the technique is performed by the plurality of VAE based generative models trained in one or more previous iterations that are configured to generate a dataset corresponding to a current iteration, and wherein the technique is performed by the one or more discriminative instances of original dataset in one or more previous iterations that are configured to generate a dataset corresponding to a current iteration.

17. The one or more non-transitory machine-readable information storage mediums of claim 13, wherein the one or more discriminative instances are identified based on a plurality of clusters generated from the previous dataset using one or more latent sequences comprised in the plurality of trained VAE based generative models.

* * * * *